US012637877B2

(12) United States Patent
Baum et al.

(10) Patent No.: US 12,637,877 B2
(45) Date of Patent: May 26, 2026

(54) SECURING CABLE FOR SECURING MOVABLE OBJECTS

(71) Applicant: TEXLOCK GMBH, Leipzig (DE)

(72) Inventors: Alexandra Baum, Leipzig (DE); Suse Brand, Leipzig (DE)

(73) Assignee: Texlock GMBH, Leipzig (DE)

( * ) Notice: Subject to any disclaimer, the term of this patent is extended or adjusted under 35 U.S.C. 154(b) by 240 days.

(21) Appl. No.: 16/772,785

(22) PCT Filed: Dec. 10, 2018

(86) PCT No.: PCT/EP2018/084108
§ 371 (c)(1),
(2) Date: Jun. 14, 2020

(87) PCT Pub. No.: WO2019/115430
PCT Pub. Date: Jun. 20, 2019

(65) Prior Publication Data
US 2020/0332564 A1      Oct. 22, 2020

(30) Foreign Application Priority Data

Dec. 14, 2017      (DE) ...................... 10 2017 129 894.0

(51) Int. Cl.
*E05B 67/00*          (2006.01)
*B62H 5/00*          (2006.01)
*E05B 71/00*          (2006.01)
(52) U.S. Cl.
CPC ........... *E05B 67/003* (2013.01); *B62H 5/003* (2013.01); *E05B 71/00* (2013.01)

(58) Field of Classification Search
CPC ..... B62H 5/003; E05B 45/005; E05B 67/003; E05B 71/00; E05B 73/0011; B63B 21/04
See application file for complete search history.

(56) References Cited

U.S. PATENT DOCUMENTS 5,706,679 A      1/1998 Zane et al.
5,889,463 A  *   3/1999 Judd ................... B60R 25/1001
                                                             340/432
(Continued)

FOREIGN PATENT DOCUMENTS

DE        20 2013 103129          7/2013
DE          102015005412 A1 *  11/2016  ............. E05B 15/16
(Continued)

*Primary Examiner* — Vernal U Brown
(74) *Attorney, Agent, or Firm* — The Webb Law Firm

(57)          ABSTRACT

Described herein is a securing cable comprising three, four or more braids, woven fabrics or laid scrims consisting of fibres or yarns and being disposed one on top of the other, wherein the securing cable has a chain as core. The structure of the described securing cable ensures not only improved protection against mechanical action, such as sawing, cutting with a bolt cutter or tearing, by the presence of the three, four or more braids or woven fabrics made up of fibres or yarns, but also improved cutting resistance with respect to sharp-edged objects, such as knives, for example, by the presence of the chain. The selection of the materials which are used for producing the laid scrims, braids or woven fabrics additionally allows effective protection against the action of heat, fire and cold.

20 Claims, 8 Drawing Sheets

(56)                     References Cited

U.S. PATENT DOCUMENTS

| | | | | |
|---|---|---|---|---|
| 9,193,418 | B1 * | 11/2015 | Brelsford | ................ B63B 21/00 |
| 9,243,428 | B1 | 1/2016 | Miracle | |
| 9,470,021 | B2 * | 10/2016 | Kindstrand | ........... E05B 67/003 |
| 2013/0320076 | A1 * | 12/2013 | Katschke | ............... A45C 13/24 |
| | | | | 229/307 |

FOREIGN PATENT DOCUMENTS

| | | | | | |
|---|---|---|---|---|---|
| EP | 0 070 124 | | 4/1996 | | |
| EP | 1077173 | A2 * | 2/2001 | ............ | B62H 5/003 |
| JP | 3593069 | B2 † | 11/2004 | | |
| WO | WO-2013051043 | A2 * | 4/2013 | ............ | A62B 35/00 |
| WO | 2016/173716 | | 11/2016 | | |

* cited by examiner
† cited by third party

A)

B)

C)

SECURING CABLE FOR SECURING MOVABLE OBJECTS

CROSS-REFERENCE TO RELATED APPLICATIONS

This is the U.S. National Stage of International Patent Application No. PCT/EP2018/084108 filed on Dec. 10, 2018, which in turn claims the benefit of German Patent Application No. 102017129894.0 filed on Dec. 14, 2017.

FIELD OF THE INVENTION

The invention relates to a securing cable comprising three, four or more braided, woven or laid fabrics consisting of fibers or yarns arranged one on top of another, wherein the securing cable has a chain.

BACKGROUND OF THE INVENTION

Securing cables or securing strands are used in practice, for example in cable locks for two-wheeled vehicles. In this case, the securing strand is normally formed by a core cable of metal wire, which is additionally encased by a plastics sheath for protection against weathering influences. The lock parts to be locked with one another are attached at the two free ends of such a securing strand. These securing strands are therefore used in the case of bicycle locks, since on the one hand they have a relatively high tensile strength with low production outlay or production costs and consequently offer comparatively good protection against theft in the event of an attempt to break open the lock by pulling apart the lock parts locked with one another. On the other hand, they are flexible and therefore can adapt easily to a wide variety of conditions. However, the wire cable always springs back again into its originally unbent form. If it is intended to improve the protection against theft in the case of securing strands of this type, it is expedient for example to increase the strength (thickness) of the core cable. However, as a result, the securing strand increasingly loses its flexibility until it is almost rigid. If, by contrast, a high-grade material is used for all cable cores or cable strands in order to avoid increasing the size of the cross section and thereby preserve the flexibility, the production costs increase considerably. In the simplest case, the core cable is generally only protected by a simple plastics sheath and consequently is relatively easily accessible to attack by means of hacksaws or bolt cutters.

After damage to or destruction of the core cable, such previously known securing strands offer no further protection against theft. The security against theft of securing strands of this type is therefore limited.

DE 93 00 319.6 U1 discloses a flexible securing strand in the form of a cable, in particular for securing two-wheeled vehicles, characterized in that the steel cable customary in the case of cable locks is replaced by a combination of braided synthetic fibers. A roughly and loosely woven strand of aramid fibers, to which are added some stainless-steel wires which are likewise woven together into the core, serves as a core cable. This core cable is encased by a polyester fiber and forms a hollow cable.

DE 29512550 U1 likewise discloses a flexible securing strand, which is in the form of a cable or tube, for securing movable objects, in the case of which the steel cable customary in the case of cable locks is replaced by a combination of synthetic fibers in conjunction with a combination of metallic and nonmetallic materials, which pass through or else only encase, or both pass through and encase, these fibers, and polymeric or rubber materials are used as an encasing or sheath of the above-described materials or combinations of materials.

Although the construction described in DE 93 00 319.6 U1 and DE 29512550 U1 provides improved protection against saws, bolt cutters, breaking or diamond tools, it does not provide improved resistance to cutting. Such securing strands can be severed by a sharp knife more easily than conventional cable locks with a steel cable core.

DE 20 2008 015 885 U1 discloses a flexible bicycle lock, which consists of a plurality of modified one-sided chain links with eyes at both ends, which are joined together by means of a joining process and in that a normal short two-sided chain link is respectively arranged between the one-sided chain links and has normal chain links at the ends of the chain for the purposes of hanging a padlock. The lock can be sheathed with plastic, rubber etc. Although a construction of this type exhibits increased resistance to cutting, sheathing the chain links with plastic or rubber merely serves to avoid damage to the objects to be secured or injuries to the user, which can be caused by the chain links. A construction of this type offers no improved protection, for example against saws, bolt cutters, breaking or diamond tools.

DE 20 2013103129 U1 discloses a bicycle lock which has a sheath and a closing element and generally consists of a metal chain or a metal cable. The sheath serves on the one hand for protecting the objects to be secured against damage, and on the other hand for increasing road safety for the bicycle and optionally for the rider of the bicycle. For this purpose, the sheath comprises a light-reflecting and/or fluorescent coating. This configuration achieves the effect that radiation impinging on the bicycle lock is reflected and/or fluorescence is produced, with the result that the bicycle is provided with an additional safety function by way of the sheath of the bicycle lock. This sheath does not contribute to increasing security against theft.

DESCRIPTION OF THE INVENTION

Improved security against theft means that the securing cable withstands an attempt to break it open for a sufficiently long time. "A sufficiently long time" is to be understood as a period of time that a thief considers to still be acceptable for cracking or destroying a lock during the theft. Conventional securing devices, such as for example bicycle locks, can in principle be destroyed in a variety of ways and by a wide variety of auxiliary means: by sawing open, separating by means of bolt cutters, abrasive cutters or diamond tools, by cutting through by means of sharp blades, by breaking or by the action of heat (for example by means of fire, gas burners or the like) or cold. Locally intense supercooling by means of a refrigerant (for example liquid helium, liquid nitrogen or liquid oxygen) leads to conventional materials, such as for example steel, becoming brittle and being able to be broken by a few hammer blows. However, if the securing device withstands the attempt to break it open for a sufficiently long time, a thief must fear being caught. In most cases, it should therefore be sufficient if the security cable withstands attempts to break it open for several minutes.

The object of the invention is therefore to provide a sufficiently flexible securing cable or securing strand which has a low weight and improved security against theft.

The object of the invention is achieved by a securing cable for securing objects, wherein the securing cable has three, four or more laid, braided or woven fabrics consisting of fibers or yarns, the braided or woven fabrics are arranged on top of one another, characterized in that the securing cable has a chain as a core.

This construction of the securing cable according to the invention ensures both improved protection against mechanical action, such as sawing, bolt cutters, breaking or diamond tools, by the presence of the three, four or more braided or woven fabrics consisting of fibers or yarns and improved resistance to cutting with respect to sharp-edged objects, such as for example knives, by the presence of the chain. The selection of the materials used for producing the laid, braided or woven fabrics moreover allows effective protection against the action of heat and cold.

In the context of the invention, a laid fabric is understood to be a textile sheet material consisting of one or more plies of parallel elongate threads. The threads are usually fixed at the crossing points. The fixing takes place either in a materially bonded manner or mechanically by friction and/or in a positively locking manner. Laid fabrics can be formed as single-ply or multi-ply. In the case of multi-ply laid fabrics, the thread plies can all have different orientations and also consist of different thread counts and different thread finenesses. In contrast to woven fabrics, laid fabrics have better mechanical properties as reinforcing structures in fiber/plastic composites, since the fibers are present in elongate form and therefore there is no additional structural strain and the alignment of the threads can be defined specifically for the respective application.

The laid fabrics for use in the securing cable according to the invention are typically aligned in parallel or are in the form of strands.

Braided fabrics consist of a plurality of regularly interlaced strands, such as fibers, yarn, metal wires etc.

The braided fabrics for use in the securing cable according to the invention are typically in the form of a tubular layer.

Woven fabrics are manually or mechanically fabricated textile sheet materials consisting of at least two thread systems, which cross at right angles or almost at right angles, warp threads in the longitudinal direction and weft threads in the transverse direction, which are connected by crossing of the threads. Most woven fabrics are single-ply woven fabrics, each with only one warp thread system and one weft thread system. If a plurality of warp or weft thread systems are used, reinforced woven fabrics are obtained. The use of reinforced woven fabrics, which are selected for example from double-weft weaves (containing two weft thread systems and one warp thread system), double-warp weaves (one weft thread system and two warp thread systems) and double woven fabrics (two warp and two weft thread systems), is also suitable for the invention. Typical double woven fabrics are piqué, côtelé, calmuc and matelassé. Double woven fabrics consist of two woven fabrics woven together in different ways.

The woven fabrics for use in the securing cable according to the invention are typically in the form of a tube.

The securing cable according to the invention preferably has 3, 4, 5, 6, 7, 8, 9 or 10, more preferably 3, 4, 5 or 6, particularly preferably 3, 4 or 5 laid, braided or woven fabrics consisting of fibers or yarns which are arranged in the form of a sheath or tube in layers or plies one on top of another, wherein a chain forms the core of the securing cable.

In each case, the laid, braided or woven fabrics can be prefabricated as a tube and then arranged over the chain or the respectively previous layer. Another possibility consists in providing sheet-like laid, braided or woven fabrics which are than wound around the chain or the respectively previous layer. It is particularly preferred here if the layers or plies lying on top of one another are arranged with a change in the winding direction from one ply to the next following ply. This increases the resistance of the cable to sawing, bolt cutters, breaking or diamond tools. A combination of layers prefabricated in the form of a tube and wound layers is also conceivable.

An increase in the security against theft of the securing cable according to the invention is achieved in particular in that, in addition to the laid, braided or woven fabrics, the chain of the securing cable is surrounded by multifilaments or yarns or twines. The multifilaments or yarns or twines are preferably arranged directly around the chain, beneath or within the laid, braided or woven fabrics arranged in the form of a tube. This arrangement efficiently prevents the action of a saw, a bolt cutter or diamond tools and increases the resistance of the securing cable to breaking.

A person skilled in the art understands a filament to be a fiber with any desired length. Multifilaments contain a plurality to a large number of filaments lying next to one another, for example 2 to 1000, 10 to 900, 20 to 800 or 30 to 700, preferably 40 to 600 or 50 to 500 filaments lying next to one another.

Yarn is a linear textile structure consisting of one or more fibers. It is a textile intermediate product, which can be processed to form laid, braided or woven fabrics, for example. Twine is understood to be a thread (linear textile) consisting of a plurality of yarns or yarn threads twisted together. A twine can have a substantially higher tear resistance than the untwined single yarns together.

In one preferred embodiment of the invention, the chain is surrounded by multifilaments. In a further preferred embodiment, the chain is surrounded by yarns. In a further preferred embodiment, the chain is surrounded by twines. Furthermore, it is particularly preferred when the multifilaments, yarns or twines surrounding the chain are not arranged tautly, but rather loosely around the chain. This construction of the securing cable according to the invention is particularly resistant to sawing or tearing. The teeth of a saw blade become caught in the multifilaments, yarns or twines and pull them along with them without severing them. This effect is assisted further when fibers, of which the multifilaments, yarns or twines consist, do not consist of a brittle material, which easily breaks when subjected to loading by tearing or by tensile forces, but rather an elastic material. The multifilaments, yarns or twines preferably consist of man-made fibers, mixtures of various man-made fibers or mixtures of man-made fibers and natural fibers, which are described below.

As described above, the construction of the securing cable according to the invention results in improved security against theft. In conjunction therewith, the securing cable according to the invention also has increased tear resistance and increased tensile strength. Together with the securing of movable objects against theft, this opens up further application possibilities for the securing cable, for example in seafaring, in surveying, building construction and transport, as constituent parts of machines such as cranes, freight elevators, pulley systems etc. as well as in climbing sports, tug-of-war, in cordoning and towing etc.

Depending on the intended application, the measurements, such as diameter, circumference, layer thickness, of the individual constituent parts or layers of the securing cable according to the invention, are configured differently.

The multifilaments, yarns or twines arranged around the chain in the core of the securing cable form a tubular layer, the diameter of which is in the range of >3 mm to 50 mm. For applications in the area of securing against theft or in the area of sports, such as for example in climbing, the diameter of this layer is preferably >3 mm to 10 mm, particularly preferably >3 mm to 8 mm or >3 mm to 5 mm. In this connection, ">3 mm" means that the diameter of this layer is at least slightly greater than the diameter of the chain, such as for example 3.1 mm, 3.2 mm, 3.3 mm, 3.4 mm, 3.5 mm, etc.

For applications in areas with high tensile loading, such as for example in building construction, transport, towing etc., the securing cable according to the invention is correspondingly larger, i.e. is stronger and also of longer dimensions. The diameter of the tubular layer arranged around the chain and consisting of multifilaments, yarns or twines is then preferably in the range of 5 mm to >30 mm, 10 mm to >30 mm, 15 mm to >30 mm, particularly preferably 20 mm to >30 mm or 25 mm to >30 mm. In this connection, ">30 mm" means that the diameter of this layer is at least slightly greater than the diameter of the chain, such as for example 31 mm, 32 mm, 33 mm, 34 mm, 35 mm, etc.

In the context of the invention, "diameter" is defined as the external diameter of the respective layer in the form of a sheath or tube.

With respect to the type of material of the fibers or yarns, the same applies to the laid, braided or woven fabrics of which the layers, in the form of a sheath or tube, of the securing cable according to the invention consist.

The fibers or yarns for forming the laid, braided and/or woven fabrics are preferably selected from man-made fibers and natural fibers or yarns consisting thereof.

Preferred man-made fibers for use in the individual layers of the securing cable according to the invention are selected from fibers of natural polymers, fibers of synthetic polymers, fibers of inorganic substances and metal fibers.

In one embodiment of the invention, the fibers of natural polymers are selected from fibers of regenerated cellulose, such as viscose, modal, lyocell and cupro; fibers of cellulose esters, such as acetate fibers and triacetate fibers; protein fibers, such as regenerated protein fibers, modified soybean protein fibers, maize protein fibers, casein fibers and artificial spun fibers; polylactide fibers, alginate fibers, chitin fibers, elastodiene fibers, and biobased polyamide fibers.

In a further embodiment of the invention, the fibers of synthetic polymers are selected from fibers of polyester, such as for example polyethylene terephthalate (PET), polytrimethylene terephthalate (PTT) and polybutylene terephthalate (PBT); polyamide (PA), polyimide, polyamide-imide, aramid, polyacrylic, modacrylic, polytetrafluoroethylene (PTFE), polyethylene (PE), polypropylene (PP), polychloride, elasthane, polybenzoxazole, polybenzimidazole, polyurea, melamine, polyphenylene sulfide, trivinyl, elastolefin, elastomultiester, polyvinyl alcohol, vinylal, polycarbonate; and polystyrene.

In a further embodiment of the invention, the fibers of inorganic substances are selected from ceramic fibers, quartz fibers, glass fibers, basalt fibers, carbon fibers, boron fibers, crystal fibers, slag fibers and nanotube fibers.

In a further embodiment of the invention, the fibers or yarns are selected from polyester fibers (PES), aramid fibers, glass fibers and fibers of high-modulus polyethylene (HMPE).

It is particularly preferred when the laid, braided and/or woven fabrics contain mixtures or combinations of the above-described fibers or yarns.

PES fibers have several advantages in conjunction with the securing cable according to the invention. They are particularly resistant to light and weathering and therefore resistant to climatic influences. Polyester fibers can also be used where it is primarily a matter of lightness and fineness. Polyester fibers are very suitable for mixtures with natural fibers. Woven fabrics of polyester fibers or mixtures with a correspondingly high proportion have a low tendency to crease and retain their dimensional stability even under the action of moisture. Polyester fibers have a good moisture transporting capability and dry quickly. They are easy to care for. They have a high strength, which results in superior durability.

Apart from PES, suitable man-made fibers for fiber mixtures are also polyamide, polyurethane and elasthane.

Polyamide is very elastic and does not crease much.

Polyacrylic fibers are very bulky and have a wool-like character. The material scarcely creases, can be dyed well during production (as can polyester), is elastic and soft. Primarily on account of its elastic and wool-like character, laid, braided and/or woven fabrics containing fiber mixtures in which polyacrylic fibers are contained offer increased protection against the action of a saw or a bolt cutter. On account of their elasticity, these fiber mixtures are particularly resistant to tearing or to some extent 'evade' the cutting of a bolt cutter.

Polyurethane is likewise a strongly elastic fiber. Polyurethane is normally not used in its pure state but rather is admixed with other fibers to provide them with elasticity. Polyurethane is the main constituent of elasthane and Spandex®. Polyurethane can also be foamed and, in this form, find use in the securing cable according to the invention, for example as a rain-repelling outer sheath. Polyurethane can for example also be applied to a textile substrate. In this case, a structure which serves for esthetic purposes can also be pressed in.

Elasthane consists largely of polyurethane and is a strongly elastic synthetic fiber. Elasthane is normally not used in its pure state but rather is admixed with other fibers to provide them with elasticity. Elasthane can be dyed well during production (as can polyester).

Laid, braided and/or woven fabrics containing fiber mixtures of polyurethane fibers or elasthane fibers offer increased protection against the action of a saw or a bolt cutter on account of their elasticity.

A further requirement for the securing cable according to the invention consists in increasing the resistance to cutting, e.g. with respect to sharp blades, such as that of a knife. The resistance to cutting of the securing cable is increased, for example, by using laid, braided and/or woven fabrics containing aramid fibers. There are various types of aramid fibers. Synthetic fibers of para-aramid are known under trade names such as Kevlar®. Their excellent properties make equipment and accessories secure and resistant to cutting. Para-aramid fibers are lightweight and nonetheless stronger than steel, impact-resistant, strong under tension, tear-resistant and heat-resistant. In one embodiment of the invention, they are mixed with other technical fibers, for example by admixing elastane. Also preferred is bonding with the non-combustible textile fiber PANOX®, an oxidized, thermally stabilized polyacrylic fiber. In a further embodiment of the invention, an additional aluminum coating of para-aramid takes place on the surface, as a result of which the temperature resistance and insulating action thereof are increased.

The use of para-aramid has an advantageous effect on the securing cable according to the invention since it is flame-retardant, does not melt and has a high temperature resistance, an above-average resistance to cutting, is extremely strong under tension and exhibits good resistance to chemicals.

Meta-aramid fibers, such as for example Nomex®, are extremely heat-resistant. The flame-resistant fibers extinguish themselves after removal of the fire source. At temperatures of more than 370° C., Nomex® begins to char. As a result of this endothermic reaction, the material builds up a protective shield, and heat can only penetrate slowly—a useful gain of time. Meta-aramids are furthermore stable with respect to numerous solvents, acids and bases. Its static charge can be avoided by admixing carbon or metal fibers. The use of para-aramid has an advantageous effect on the securing cable according to the invention since it offers permanent flame protection, has a long service life, does not break open under the action of flames, is resistant to acids, bases and gases and has antistatic properties.

Also particularly suitable for use in the laid fabrics, braided fabrics, woven fabrics, multifilaments and yarns are fibers of polyethylene, in particular HPPE, HMPE or UHMW-PE. The abbreviations HPPE, HMPE and UHMW-PE stand for "high-performance polyethylene fibers" and "ultra-high molecular weight polyethylene" respectively. Both refer to a polyethylene fiber, which is known under trade names such as Dyneema® or Spectra®. The molecular weight of HPPE is 10 to 100 times greater than that of normal polyethylene (PE). HPPE has a relative density that is even lower than that of aramids by approximately a further 30%, and at the same time is extremely fatigue-resistant. Further advantages are high UV resistance, low extension at break and high resistance to cutting and abrasion. Thanks to their chemically simple structure, the fibers are particularly insensitive to chemicals. An example of an HPPE fiber is the Dyneema® fiber. This has tensile strength values of 3 to 4 GPa (3000 to 4000 N/mm$^2$). The tearing length of Dyneema is just under 400 km. With a density of 0.95 to 0.97 g/cm$^3$, Dyneema is somewhat lighter than water and floats. The fiber can be kept for a very long time and has a high resistance to abrasion, moisture, UV rays and chemicals. The strength at room temperature is very high and rises as the temperature falls. At −30° C., the increase in strength is already 30% with respect to room temperature.

The securing cable according to the invention, which in one preferred embodiment contains laid, braided and/or woven fabrics containing aramid fibers and/or HMPE fibers, is accordingly particularly heat-resistant, cold-resistant and particularly resistant to the action of cutting.

The heat resistance and resistance to cutting are increased further according to the invention in that the securing cable contains laid, braided and/or woven fabrics containing fiber mixtures which contain at least one further fiber or one further yarn that is selected from ceramic fibers, quartz fibers, glass fibers, basalt fibers, carbon fibers, boron fibers, crystal fibers, slag fibers and/or nanotube fibers or yarns thereof.

The resistance to cutting with respect to sharp objects, such as for example a knife blade, is particularly effectively increased according to the invention in that the securing cable has a chain as a core. In the context of the invention, a chain is understood to be a chain strand with a multiplicity of movable chain links which are interlinked or connected by joints. The chain is formed for example as a curb chain or an anchor chain or consists of a plurality of modified one-sided chain links with eyes at both ends, which are joined together by means of a joining process, as well as normal two-sided chain links arranged between the one-sided chain links.

The chain can consist of a variety of materials, for example of metal or plastic.

In one preferred embodiment, the chain consists of metal, such as for example steel, hardened steel, galvanized steel, stainless steel, titanium, aluminum or of a metal alloy.

In one likewise preferred embodiment of the invention, the chain consists of plastic or a composite material. Suitable composite materials are for example metal/plastic composite materials, fiber-reinforced or glass-containing composite materials.

In a particularly preferred embodiment, the chain consists of a composite material selected from glass fiber-reinforced glass, a metal matrix composite material, e.g. of boron-reinforced aluminum, ceramic fiber composite materials (e.g. of carbon fiber-reinforced silicon carbide), self-reinforced thermoplastics (plastic fibers in a plastic matrix of the same composition), fiber/plastic composites, such as carbon fiber-reinforced plastic (CFP), glass fiber-reinforced plastic (GFP), aramid fiber-reinforced plastic (AFP), natural fiber-reinforced plastic (NFP), TiGr composite (material of titanium, carbon fibers and epoxy resin) and glass fiber-reinforced aluminum (material of glass fiber-reinforced plastic and aluminum).

Particularly preferred according to the present invention is a securing cable which has a metal chain as a core.

In a further embodiment, the material of the chain has been subjected to a surface treatment or surface finishing and has a corresponding coating. These include processes such as galvanization, powder coating etc. The properties of the surface of the chain are optimized in order to fulfil further functions by the surface treatment. The galvanization of the steel chain, for example, increases corrosion protection, or else as an alternative thereto the steel chain can also be provided with a PVC coating for this purpose.

Depending on the field of application, the size of the chain, in particular the thickness or diameter thereof, is configured differently. For securing movable objects against theft, chains having a diameter of 8 mm or less, preferably of 5 mm or less, particularly preferably of 4 mm or 3 mm, are sufficient. In the area of protection against theft, the dimensioning of the chain is preferably selected such that the weight of the securing cable is not substantially increased.

For industrial applications, larger chains are incorporated as a core into the securing cable according to the invention. The chains of this embodiment preferably have a thickness or diameter of up to 30 mm, such as for example of 10 mm or greater, particularly preferably of 15 mm or greater or 20 mm or greater, especially preferably of 25 mm or greater.

For protection against environmental influences and for esthetic reasons, the securing cable can comprise further, in particular external layers.

In one embodiment, the securing cable according to the invention also has a casing, which is preferably formed as UV-impermeable. The casing can also comprise a plastics material, in particular Teflon, acrylic and/or silicone. As a result, the textile fibers are effectively protected against weathering influences. Moreover, this casing also holds together textile fibers protruding from the fiber composite. Further textile fibers, laid fabrics, braided fabrics or woven fabrics, which do not necessarily have to fulfil security aspects but can be printed on in order to graphically design the strand lock in a particular way, can be arranged over the casing. As an alternative, the casings can also be printed on or adapted in terms of color to achieve a desired design.

In a further embodiment of the invention, the weathering-resistant casing or textile fibers, laid fabrics, braided fabrics or woven fabrics lying thereover can be designed such that security aspects, for example improved road safety, are additionally ensured. For this purpose, the casing can be equipped with reflective optical elements. Suitable optical elements are known per se and can be selected from lenses or prisms or spheres embedded in the casing or combinations thereof. As an alternative, a plastics layer, which contains such optical elements, can be arranged on the textile fibers, laid fabrics, braided fabrics or woven fabrics lying over the casing.

A further advantageous configuration of the securing cable consists in that a metallic layer can be arranged between each laid-fabric, braided-fabric or woven-fabric layer. The metallic layer preferably contains metal wires or metal foils. As an alternative, the textile fibers can also be provided with a metallic coating, wherein the metallic layer is in particular of a closed form. This arrangement of the metallic layers is particularly advantageous and increases the flame resistance of the securing cable. However, non-closed layers, which in particular have a single wire that is advantageously laid in the form of a spiral, can also be present. This arrangement also contributes to improving the flame resistance, however the tensile strength, resistance to cutting and tear resistance of the securing cable in particular are increased as a result.

In a further preferred embodiment, the casing of the securing cable according to the invention can contain abrasive substances. Suitable abrasive substances are for example particles which are preferably selected from the group containing aluminum oxides, corundum, boron carbides, silicon dioxides, silicon carbides, sands and glass particles. Instead of or in addition to the casing, the abrasive substances can be contained in layers additionally arranged between the individual laid-fabric, braided-fabric or woven-fabric layers. These abrasive substances lead to the blunting of sharp tools in the case of theft attempts.

The casing or intermediate layers arranged between the individual laid-fabric, braided-fabric or woven-fabric layers can contain further additives. Conductive substances, flame retardants, luminescent substances and metals can be contained as additives. Here, the conductive substances can be selected from the group containing carbon black, carbon fibers, metal powders and nanoparticles, in particular carbon nanotubes. Combinations of these substances can also be used. Conductive substances can be used to provide the securing cable with smart functions or an electronic anti-theft means. Phosphates, borates, in particular ammonium polyphosphate, tris(tribromo-neopentyl) phosphate, zinc borate or boric acid complexes of polyhydric alcohols are preferably used as flame retardants. These additives contribute to increased protection of the securing cable against the action of heat and fire. Preferred as luminescent substances are inorganic-based or organic-based fluorescent and/or phosphorescent substances, in particular zinc sulfide and alkaline-earth aluminates. These additives can contribute to increasing road safety (being seen in the dark).

In a further advantageous embodiment, the securing cable can have a water-repellent impregnation. The water-repellent impregnation is preferably applied to the outer casing. However, it is also possible to provide one or more of the laid-fabric, braided-fabric or woven-fabric layers with a water-repellent impregnation.

An intelligent securing of the strand lock is possible whenever at least one electrical conductor is arranged in the securing cable and alarm means are provided, which trigger an alarm when the electrical conductor is severed. This alarm could then be transmitted directly to an application of a mobile computer device, a cell phone, a smartphone or tablet PCs by suitable transmission means.

This at least one electrical conductor can be present in a variety of ways that can also be combined with one another. The chain in the core of the securing cable can thus serve as an electrical conductor if it consists of a conductive material. The above-described additives of conductive material can likewise be used to create an electrical conductor. It can be present within a metallic layer or it can be integrated, for example as a single wire or as a wire mesh, in the textile layers, for example also incorporated in at least one textile laid, braided or woven fabric.

In order to ensure protection against theft, the securing cable must be able to be connected at both ends to a suitable closing or securing device. All conventional closing devices that are used or can be used to secure movable objects against theft are suitable in principle. If the closing device is not directly fastened to the securing cable, the securing cable preferably has devices at both ends to which a closing device, such as for example a padlock, can be connected. In one embodiment, the securing cable therefore has an eye or a loop at both ends, or an eye at one end and a loop at the other end. Such loops or eyes can be created by clamping a bent end of the securing cable to the securing cable, for example by means of a clamp of metal or plastic, it preferably being provided that the connecting point is encased, in particular encapsulated. A plastic in particularly suitable for this. The loop can also be formed by sewing and then encapsulated with plastic. The eyes can have a variety of forms and can be circular or O-shaped, for example. The eyes can be formed by separate components, for example of metal or, as described above for the chain, of a composite material, which can be fixedly connected in a suitable manner to the respective end of the securing cable. Eyes of steel are preferably used. To improve protection against theft, eyes of hardened steel are particularly preferred. To improve protection against corrosion, the eyes can be provided with corrosion-inhibiting coatings, such as for example a PVC coating. As an alternative, the eyes can be galvanized. The size, in particular the diameter of the eyes can be different. The eyes of securing cables used in the area of securing movable objects against theft preferably have an internal diameter in the range of 8 mm to 200 mm, preferably of 8 to 150 mm or of 8 to 100 mm, more preferably of 8 to 90 mm, 8 to 80 mm, 8 to 70 mm or 8 to 60 mm, particularly preferably of 8 to 50 mm, 8 to 40 mm, 8 to 30 mm or 8 to 20 mm.

It can be expedient to connect the ends of the securing cable to a closing or securing device that is fixedly connected to the movable object. In a further embodiment, therefore, the securing cable can have at one end an eye or loop and at the other end a suitable securing element, which can be locked in a closing or securing device that is fixedly installed on the movable object. The objects could thus be secured by the securing cable being led around the object, the free end being drawn through the eye or loop in the process, and the free end then being locked. Such a fixedly installed closing or securing device is for example a frame lock. The suitable securing element is for example selected from a bolt or a bracket.

Furthermore, it is preferred when the securing cable has at the ends parts of a closing or securing device which interact with one another. Such closing devices are known to a person skilled in the art from the area of bicycle locks. In one embodiment of the invention, the closing or securing device is configured as a lock. In a preferred embodiment, the closing or securing device is configured as a lock that can be closed with a key. A combination lock is also conceivable as a closing device.

The length of the securing cable of the invention can be selected to be different corresponding to the desired intended use. In the area of securing bicycles, lengths between 50 cm and 200 cm are suitable. Particularly suitable are lengths between 50 cm and 160 cm, in particular between 50 cm and 100 cm. If other movable objects, such as for example boats, are to be secured, a correspondingly greater length of the securing cable is selected. The same applies for the securing cable according to the invention in the area of industrial applications.

The following embodiments of the securing cable according to the invention are particularly preferred:

i. The securing cable has a metal chain as a core. Arranged thereover are 3 layers of laid, braided and/or woven fabrics.

ii. The securing cable has a chain of a composite material as a core. Arranged thereover are 3 layers of laid, braided and/or woven fabrics.

iii. The securing cable has a chain of a composite material as a core. Arranged thereover are 4 layers of laid, braided and/or woven fabrics.

iv. The securing cable has a chain of metal as a core. Arranged thereover are 4 layers of laid, braided and/or woven fabrics.

v. The securing cable has a chain of metal as a core. Arranged thereover are 5 layers of laid, braided and/or woven fabrics.

vi. The securing cable has a chain of a composite material as a core. Arranged thereover are 5 layers of laid, braided and/or woven fabrics.

vii. The laid-fabric, braided-fabric or woven-fabric layers of the securing cable of embodiments i. to vi. consist of or contain fibers and/or yarns of different materials.

viii. The laid-fabric, braided-fabric or woven-fabric layers of the securing cable of embodiments i. to vi. consist of or contain fibers and/or yarns of the same material.

ix. At least one of the laid-fabric, braided-fabric or woven-fabric layers of the securing cable of embodiments i. to vii. contains or consists of a braided fabric of HPME yarn and PES yarn.

x. At least one of the laid-fabric, braided-fabric or woven-fabric layers of the securing cable of embodiments i. to vii. contains or consists of a braided fabric of glass-fiber yarn.

xi. At least one of the laid-fabric, braided-fabric or woven-fabric layers of the securing cable of embodiments i. to vii. contains or consists of a braided fabric of aramid yarn.

xii. The chain in the core of the securing cable according to embodiments i. to x. is surrounded by multifilaments, which preferably consist of HMPE.

xiii. The securing cable according to embodiments i. to xii. has at least one metallic layer between the laid-fabric, braided-fabric or woven-fabric layers.

xiv. The securing cable according to embodiments i. to xiii. has an outer sheath, which is formed from a decorative braided fabric, for example from PES twine.

xv. The securing cable according to embodiments i. to xiv. has an electrical conductor.

xvi. The securing cable according to embodiments i. to xv. has an eye at each end.

xvii. The securing cable according to embodiments i. to xv. has a loop at each end.

xviii. The securing cable according to embodiments i. to xv. has an eye at one end and a loop at the other end.

xix. The securing cable according to embodiments i. to xv. has an eye or loop at one end and a bolt or a bracket at the other end.

It is particularly preferred when the individual layers of laid, braided and/or woven fabrics consist of or contain fibers and/or yarns of different materials. As a result, optimum properties of the securing cable can be created. For example, more internal layers can have a high tensile strength and more external layers can have a high resistance to cutting, heat resistance or cold resistance.

The invention will be explained in more detail below with reference to 9 drawings.

Figure 1:
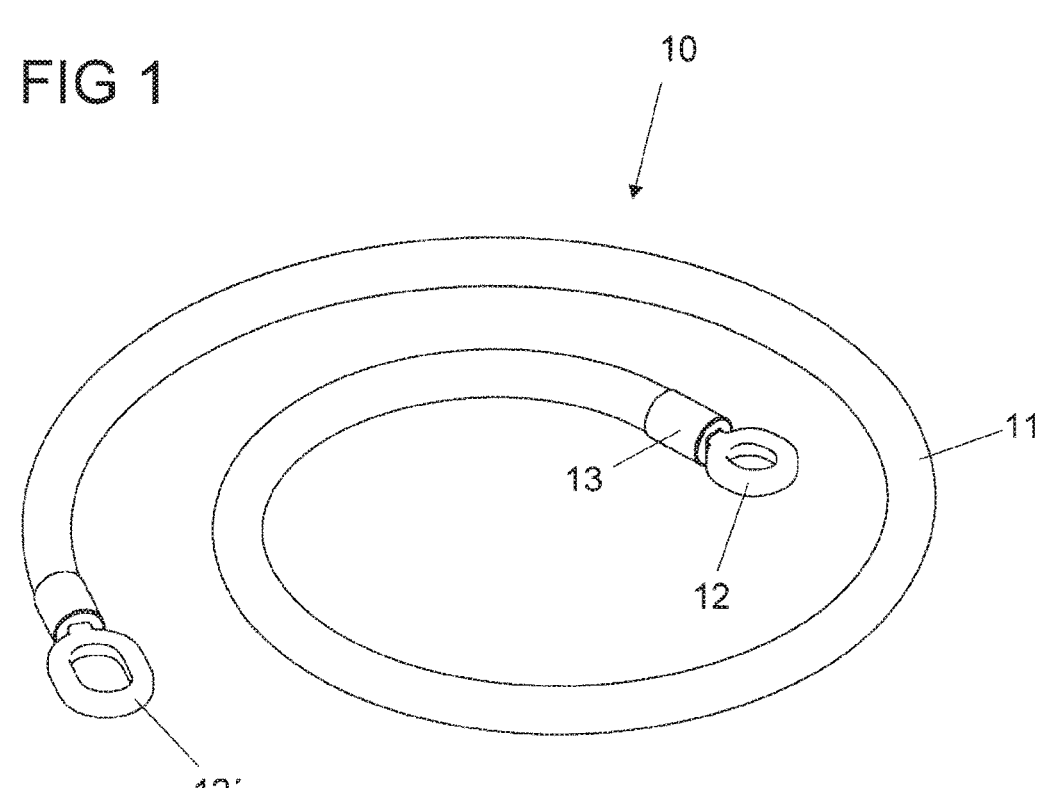
FIGS. 1, 2 and 3 show the securing cable according to the invention with a variety of types of eye.

FIG. 1 shows a securing device 10, which has the securing cable 11 according to the invention. The securing cable 11 has a round eye 12 at one end and an oval eye 12' at the other end. The two eyes 12 and 12' can be of different sizes. The small eye can be drawn through the large eye, in order for example to increase the length of the securing cable. Moreover, a large eye internal diameter also offers the possibility of connecting the cable to other shackle locks. Using the eyes, the securing cable can for example be connected to a padlock.

Figure 2:
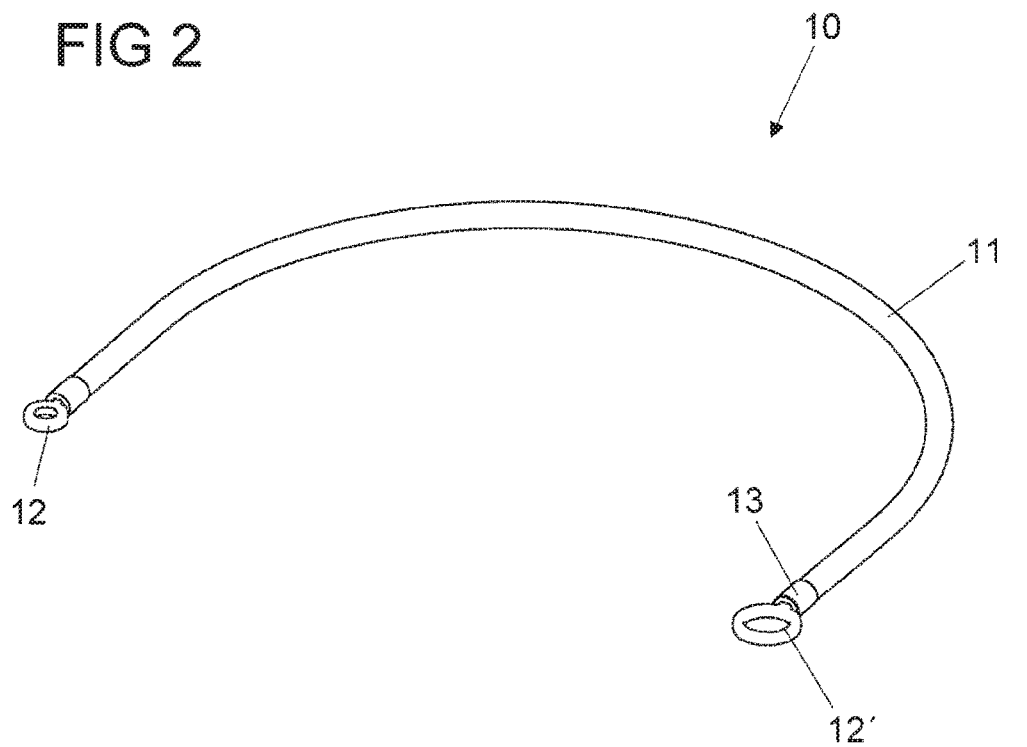

FIG. 2 shows a securing device 10, which has the securing cable 11 according to the invention. The securing cable 11 of this embodiment has at the ends round eyes 12, 12', which have different diameters.

Figure 3:
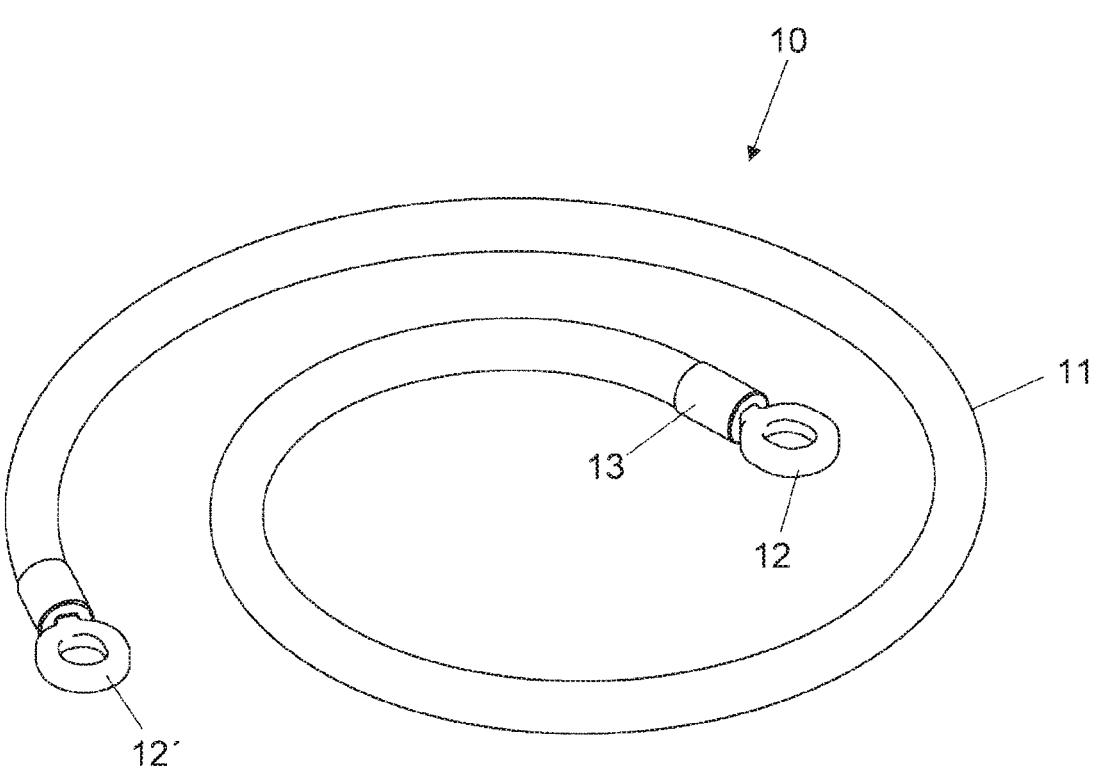

FIG. 3 shows a securing device 10, which has the securing cable 11 according to the invention. The securing cable 11 of this embodiment has at the ends round eyes 12, 12', which have the same diameter.

Figure 4:
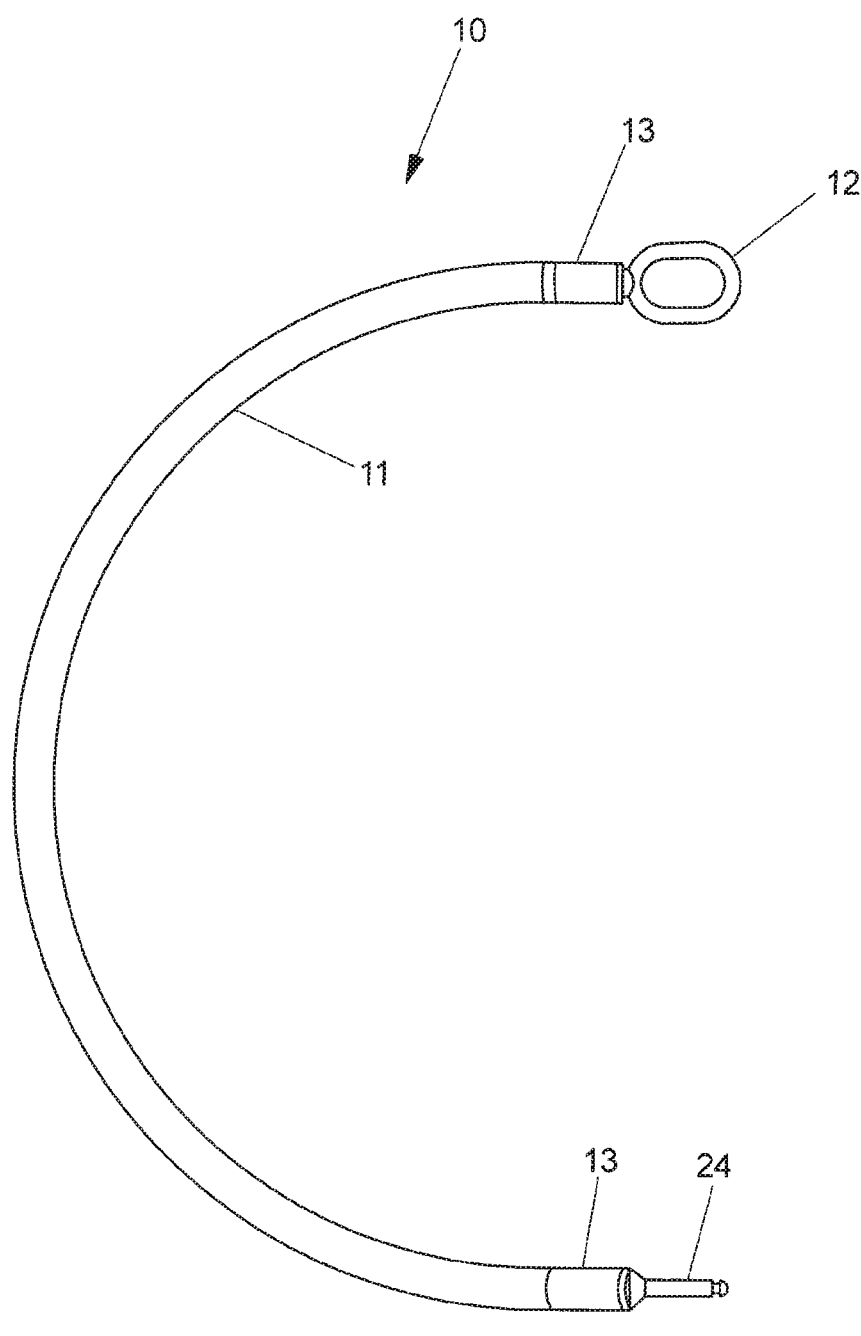
FIG. 4 shows the securing cable according to the invention with an eye and a bolt.

FIG. 4 shows a securing device 10, which has the securing cable 11 according to the invention. The securing cable 11 of this embodiment has an eye 12 at one end and a bolt 24 at the other end.

Figure 5:
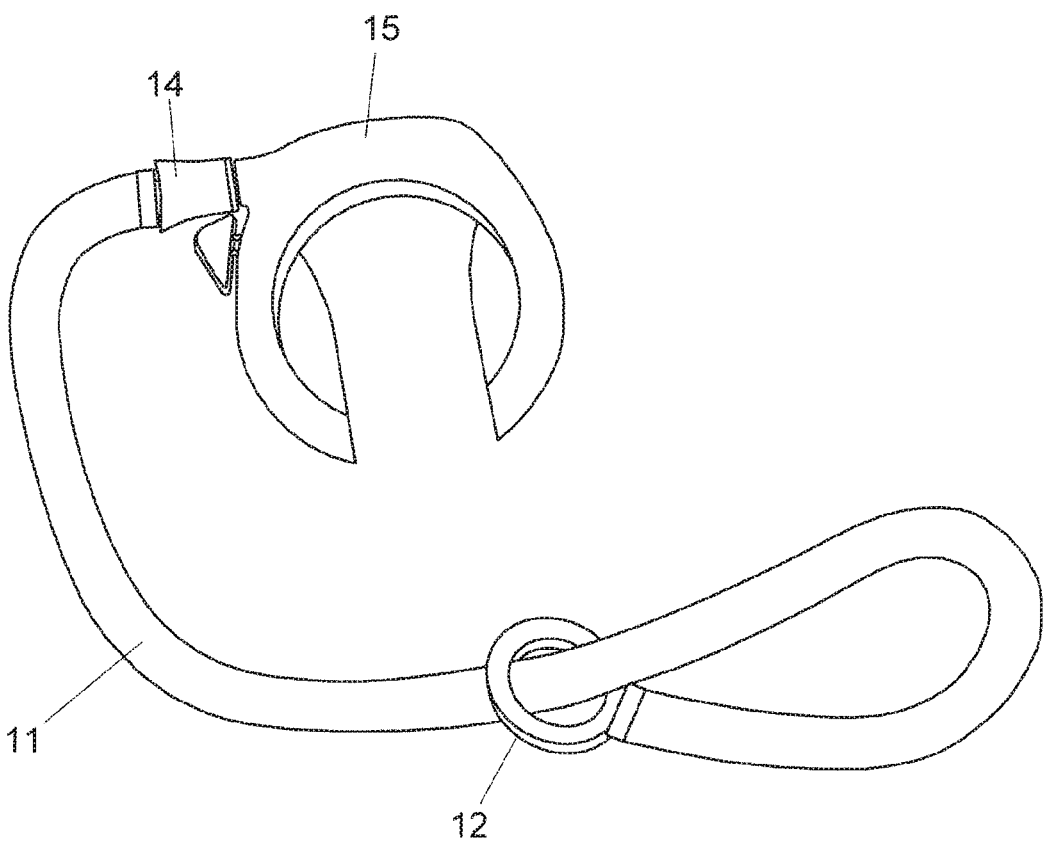
FIG. 5 shows the securing cable according to the invention for connection to a frame lock.

FIG. 5 shows one embodiment of the securing cable 11, which is connected to a frame lock 15 of a bicycle via a connecting element 14. In addition to the frame lock, which prevents the bicycle from being ridden away or pushed away, the bicycle can additionally be secured against being carried away by means of the securing cable 11. The securing cable 11 can for example be led around a street light or parts of a positionally fixedly installed bicycle stand, whereupon the end with the connecting element 14 is drawn through the eye 12 and then the securing cable 11 is locked by the connecting element 14 in the frame lock 15.

Figure 6:
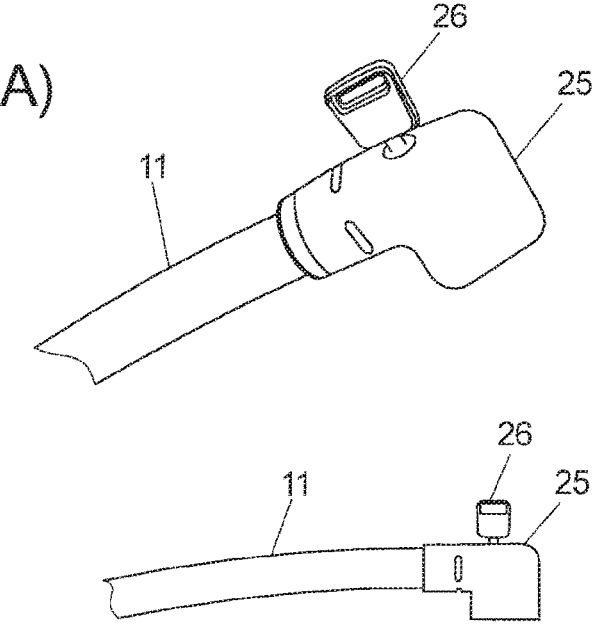
FIG. 6 shows the securing cable according to the invention with a closing device configured as a lock with a key in a variety of embodiments.
Figure 6:
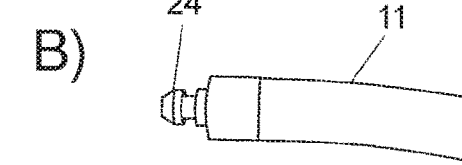
Figure 6:
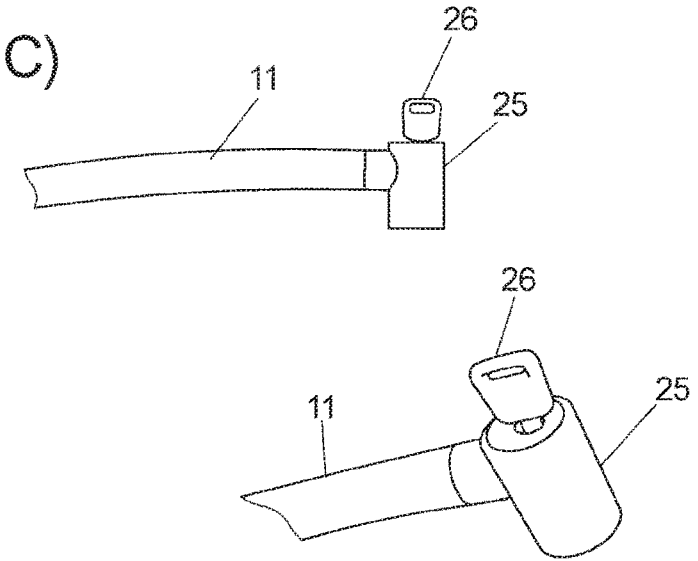

FIG. 6 shows a number of embodiments of the securing cable 11, which have a lock 25 with a key 26 at one end and a bolt 24 at the other end. The securing cable 11 is not depicted completely in FIGS. 6A-C. FIG. 6(A) shows a configuration of the lock 25 with a key 26 from two perspectives. In this configuration, the lock 25 has an L-shape. FIG. 6(C) shows a further configuration of the lock 25 with a key 26. In this configuration, the lock 25 has a T-like shape, the configuration is likewise depicted from two perspectives. FIG. 6(B) shows the other end of the securing cable 11, which has a bolt 24. To secure the object, such as for example a bicycle, the bolt 24 is locked in the lock 25, which can be closed by means of a key 26. The object to be secured can thus be secured against being carried away or pushed away. The lock 25 can also be designed in any other conceivable manner.

Figure 7:
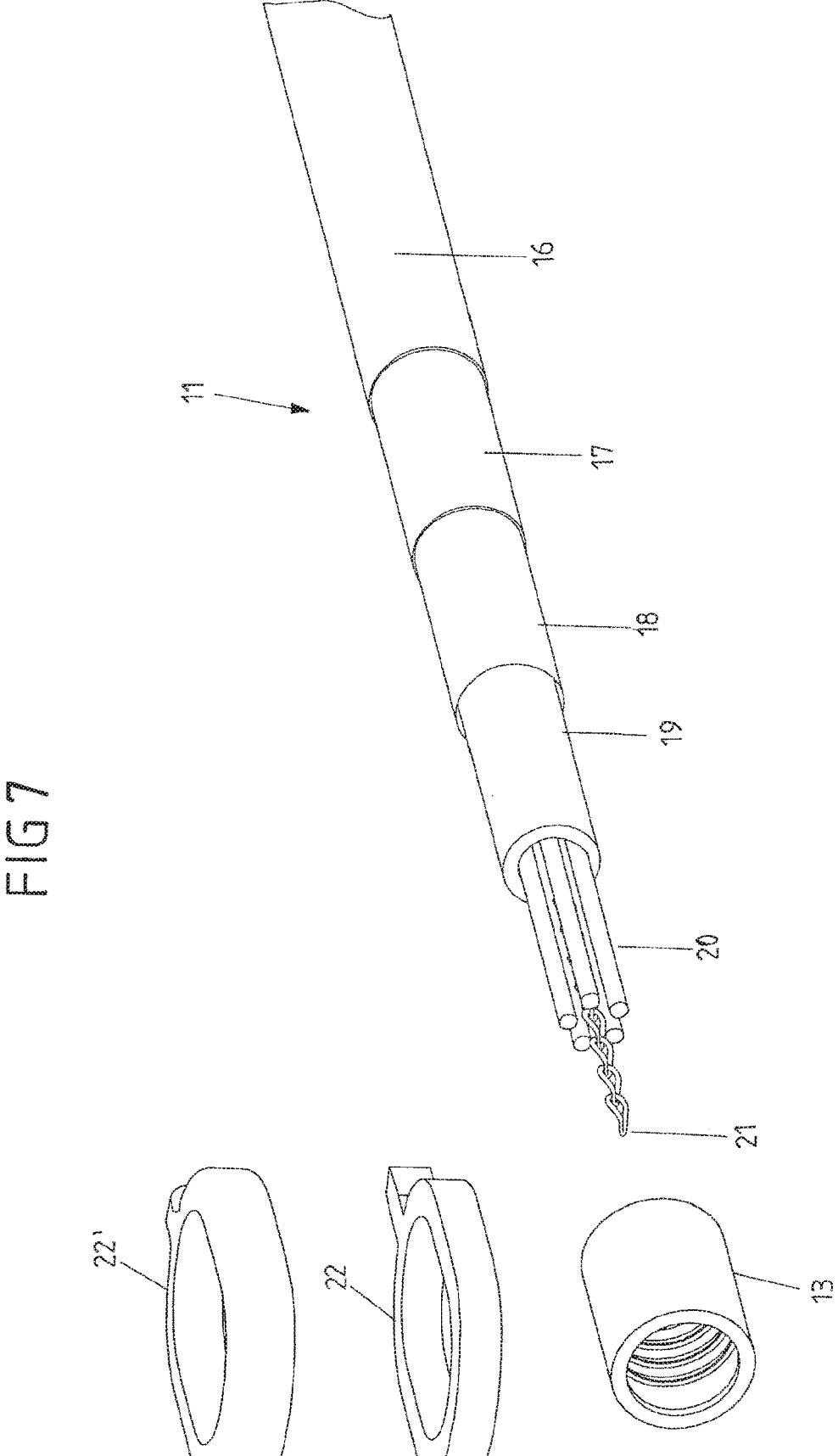
FIG. 7 shows the layered construction of one embodiment of the securing cable according to the invention with 4 outer layers.

FIG. 7 illustrates the layered construction of one embodiment of the securing cable 11 according to the invention. The core is formed by a chain 21 of metal, which is designed as a curb chain in the example shown here. The chain 21 is surrounded by multifilaments 20, which consist of fibrous materials that are resistant to cutting. The multifilaments 20 are surrounded by a braided fabric that is resistant to cutting and consists for example of a mixture of HMPE yarn and PES yarn. A fire-resistant braided fabric 18 is arranged thereover and consists for example of glass-fiber yarn. Over the braided fabric 18 is located a further braided fabric 17, which is fire-resistant and resistant to cutting and consists for example of aramid yarn. The outer termination is formed by a decorative textile braided fabric 16, which can optionally have a water-repellent and dirt-repellent impregnation.

Eyes 22, 22' can be fastened to the ends of the securing cable 11, for example by means of a metal sleeve 13. In the embodiment shown here, the eyes 22, 22' consist of steel. The eye shown as embodiment 22' is coated with PVC for protection against corrosion and for protection against damage of the movable object to be secured.

Figure 8:
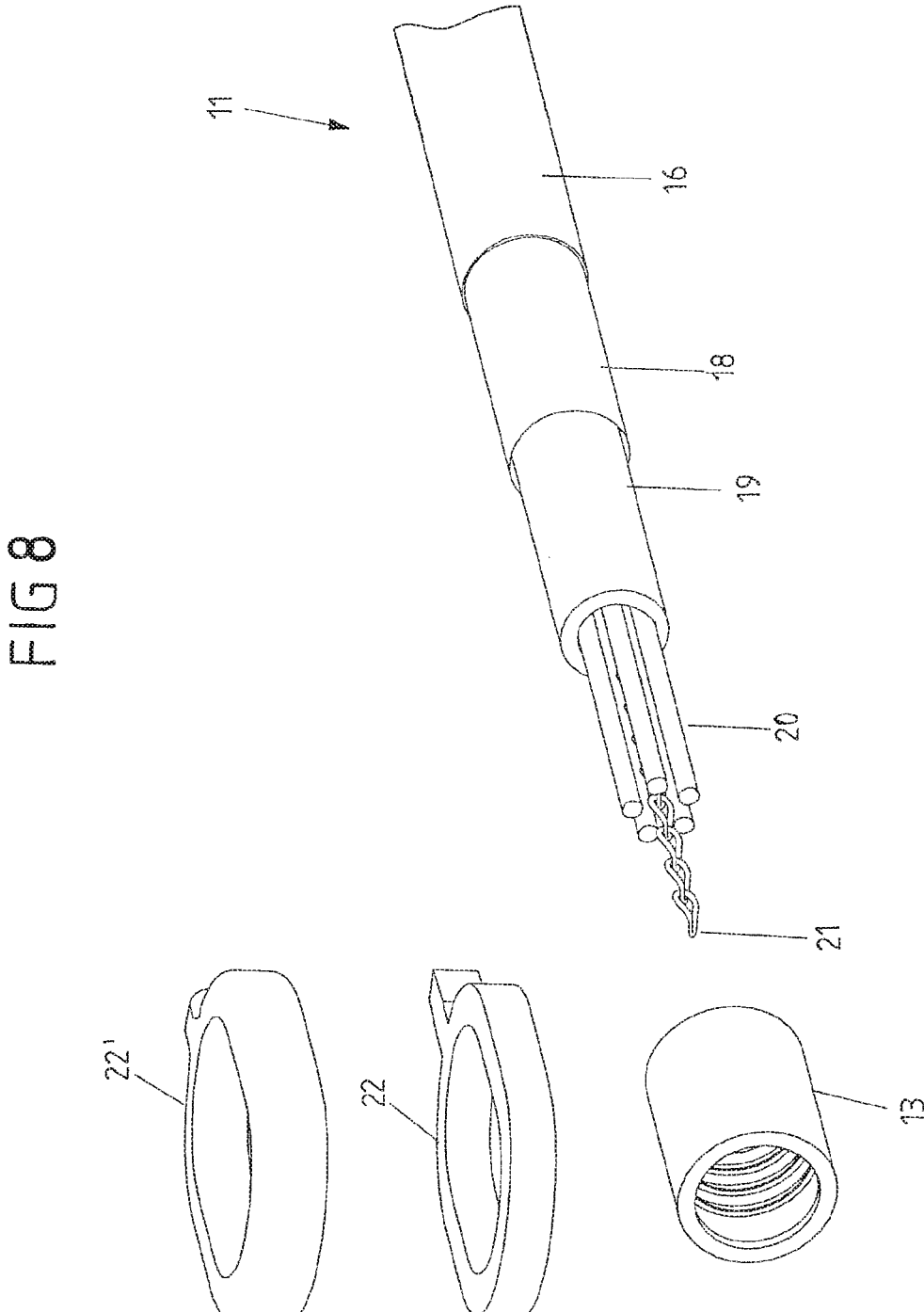
FIG. 8 shows the layered construction of one embodiment of the securing cable according to the invention with 3 outer layers.

FIG. 8 illustrates the layered construction of one embodiment of the securing cable 11 according to the invention with three outer layers. The core is formed by a chain 21 of metal, which is configured as a curb chain in the example shown here. The chain 21 is surrounded by multifilaments 20, which consist of fibrous materials that are resistant to cutting. The multifilaments 20 are surrounded by a braided fabric that is resistant to cutting and consists for example of a mixture of HMPE yarn and PES yarn. Thereover is arranged a fire-resistant braided fabric 18, which consists for example of glass-fiber yarn. The outer termination is formed by a decorative textile braided fabric 16, which can optionally have a water-repellent and dirt-repellent impregnation.

The ends of the securing cable are designed as in FIG. 7.

Figure 9:
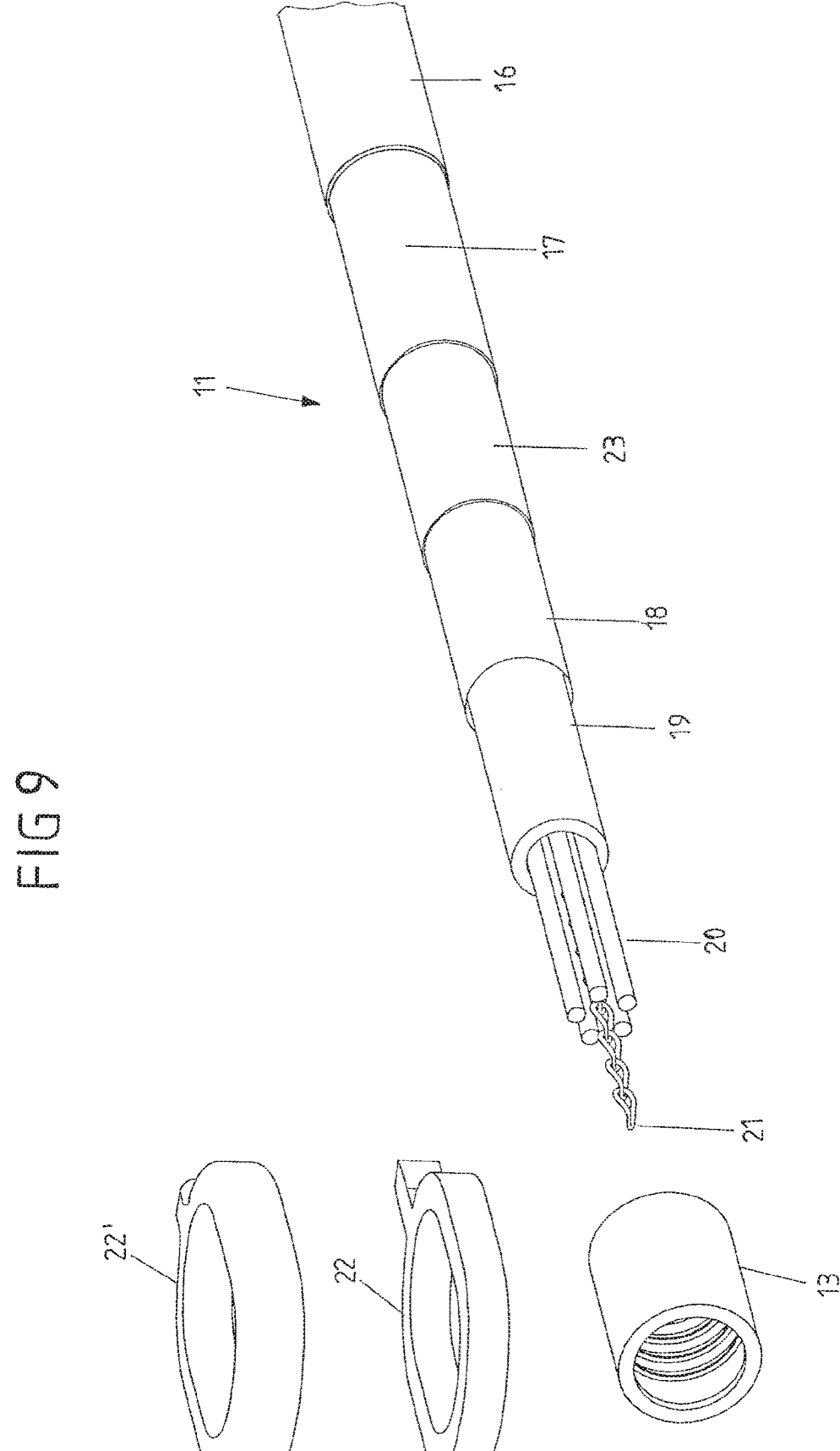
FIG. 9 shows the layered construction of one embodiment of the securing cable according to the invention with 5 outer layers.

FIG. 9 illustrates the layered construction of one embodiment of the securing cable 11 according to the invention with 5 outer layers. The core is formed by a chain 21 of metal, which is configured as a curb chain in the example shown here. The chain 21 is surrounded by multifilaments 20, which consist of fibrous materials that are resistant to cutting. The multifilaments 20 are surrounded by a braided fabric that is resistant to cutting and consists for example of a mixture of HMPE yarn and PES yarn. Thereover is arranged a fire-resistant braided fabric 18, which consists for example of glass-fiber yarn. Over the braided fabric 18 is located a further braided fabric 17, which is fire-resistant and resistant to cutting and consists for example of aramid yarn. In the embodiment shown here, a metallic layer is arranged between the layers 17 and 18. The metallic layer is formed by an aluminum foil in this example. The metallic layer is particularly advantageous and increases the flame resistance of the securing cable and at the same time serves as an electrical conductor for an alarm means. The outer termination is formed by a decorative textile braided fabric 16, which can optionally have a water-repellent and dirt-repellent impregnation.

The ends of the securing cable are designed as in FIG. 7.

The embodiments shown in FIGS. 7 to 9 of the securing cable 11 combine all of the advantages of the invention. The selection of the materials of the layers 16 to 20 provides the securing cable 11 with improved protection against mechanical action, such as sawing, bolt cutters, breaking or diamond tools and also improved resistance to cutting with respect to sharp-edged objects, such as for example knives. The chain 21 in the interior of the securing cable 11 provides additional resistance to cutting. The selection of the materials which are used for producing the laid, braided or woven fabrics moreover enables effective protection against the action of heat, fire and cold.

LIST OF REFERENCE SIGNS

10 Securing element
11 Securing cable
12, 12' Eyes
13 Metal sleeve
14 Connecting element
15 Frame lock
16 Decorative braided fabric
17 Fire-resistant and cut-inhibiting braided fabric
18 Fire-resistant braided fabric
19 Braided fabric resistant to cutting
20 Multifilaments
21 Chain
22, 22' Eyes
23 Metallic layer
24 Bolt
25 Lock
26 Key

The invention claimed is:

1. A securing cable for securing objects, comprising
(a) a chain as a core;
(b) a plurality of filamentous structures surrounding the chain, each of the plurality of filamentous structures comprising multifilaments, yarns, or twines, the plurality of filamentous structures arranged loosely around the chain; and
(c) three or more laid, braided, or woven sheet-like fabrics consisting of fibers or yarns, each of which are arranged coaxially with one another, and which together surround the plurality of filamentous structures and the chain.

2. The securing cable as claimed in claim 1, characterized in that the fibers or yarns for forming the laid, braided and/or woven fabrics are selected from the group consisting of man-made fibers and/or natural fibers or yarns consisting thereof.

3. The securing cable as claimed in claim 2, characterized in that the man-made fibers are selected from the group consisting of fibers of natural polymers, fibers of synthetic polymers, fibers of inorganic substances and metal fibers.

4. The securing cable as claimed in claim 3, characterized in that the fibers of natural polymers are selected from the group consisting of fibers of regenerated cellulose, such as viscose, modal, lyocell and cupro; fibers of cellulose esters, such as acetate fibers and triacetate fibers; protein fibers, such as regenerated protein fibers, modified soybean protein fibers, maize protein fibers, casein fibers and artificial spun fibers; polylactide fibers, alginate fibers, chitin fibers, elastodiene fibers, and biobased polyamide fibers.

5. The securing cable as claimed in claim 3, characterized in that the fibers of synthetic polymers are selected from the group consisting of fibers of polyester, such as for example polyethylene terephthalate (PET), polytrimethylene terephthalate (PTT) and polybutylene terephthalate (PBT); polyamide, polyimide, polyamide-imide, aramid, polyacrylic, modacrylic, polytetrafluoroethylene (PTFE), polyethylene (PE), polypropylene (PP), polychloride, elasthane, polybenzoxazole, polybenzimidazole, polyurea, melamine, polyphenylene sulfide, trivinyl, elastolefin, elastomultiester, polyvinyl alcohol, vinylal, polycarbonate; and polystyrene.

6. The securing cable as claimed in claim 3, characterized in that the fibers of inorganic substances are selected from the group consisting of ceramic fibers, quartz fibers, glass fibers, basalt fibers, carbon fibers, boron fibers, crystal fibers, slag fibers and nanotube fibers.

7. The securing cable as claimed in claim 2, characterized in that the laid, braided and/or woven fabrics contain mixtures or combinations of the man-made fibers and natural fibers or yarns consisting thereof.

8. The securing cable as claimed in claim 1, characterized in that the chain consists of metal or a composite material.

9. The securing cable as claimed in claim 1, characterized in that the chain is designed as a curb chain or an anchor chain.

10. The securing cable as claimed in claim 1, characterized in that the chain has a thickness of 8 mm or less for applications in the area of protection against theft and a thickness of up to 30 mm for industrial applications.

11. The securing cable as claimed in claim 1, characterized in that the securing cable further comprises a UV impermeable casing.

12. The securing cable as claimed in claim 1, characterized in that the securing cable comprises as an outer sheath a further braided or woven fabric, which consists of fibers or yarn and can be printed on.

13. The securing cable as claimed in claim 1, characterized in that a metallic layer can be arranged between each braided-fabric or woven-fabric layer.

14. The securing cable as claimed in claim 13, characterized in that the metallic layer comprises metal wires, metal foil or a metallic coating of the textile fibers, wherein the metallic layer is in particular of a closed form.

15. The securing cable as claimed in claim 1, characterized in that the casing has abrasive substances and/or in that the casing comprises a plastics material, in particular Teflon, acrylic and/or silicone.

16. The securing cable as claimed in claim 1, characterized in that the securing cable has a water-repellent impregnation applied to the outer casing.

17. The securing cable as claimed in claim 1, characterized in that at least one electrical conductor is arranged in the securing cable and alarm means are provided, which trigger an alarm when the electrical conductor is severed.

18. The securing cable as claimed in claim 1, characterized in that the securing cable has an eye and/or a loop at both ends.

19. The securing cable as claimed in claim 1, characterized in that the securing cable has at one end an eye or loop and at the other end a suitable securing element, which can be locked in a closing or securing device.

20. The securing cable as claimed in claim 1, characterized in that the securing cable has at the ends parts of a closing or securing device, which interact with one another.

* * * * *